Patented July 31, 1928.

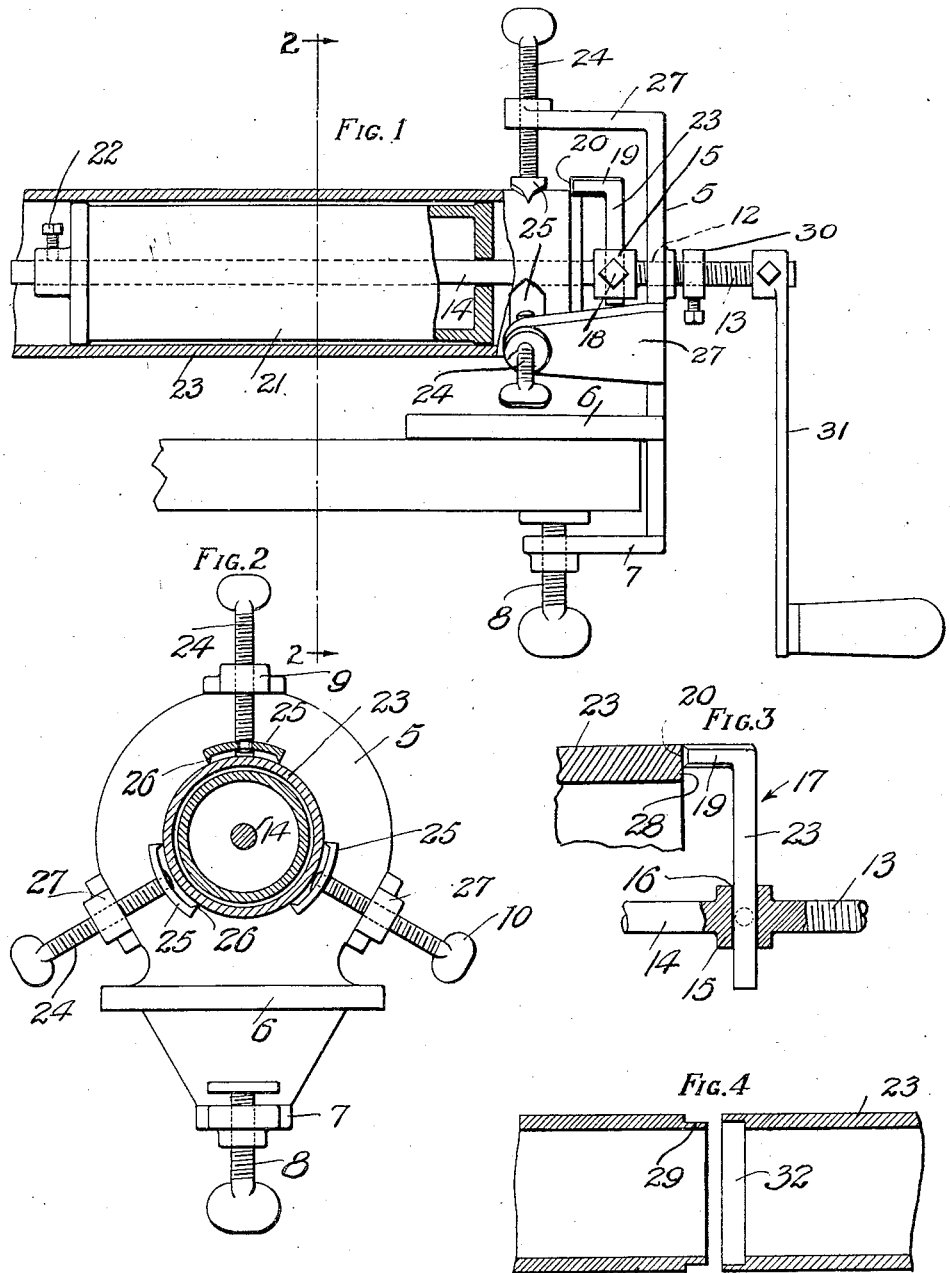

1,678,712

UNITED STATES PATENT OFFICE.

LEANDER DOW SMITH, OF LOS ANGELES, CALIFORNIA.

PIPE-SEAT-CUTTING MACHINE.

Application filed November 3, 1926. Serial No. 145,961.

This invention relates more specifically to a simple machine for forming seats on the ends of electrical composition conduits.

In laying electrical wires, such as telephone and electric light wires under ground, conduits are generally employed formed from an insulating composition. These conduits are of a standard length and are provided with an interior annular seat on one end and an annular tongue on the opposite end, in order to effect connections with adjacent conduits. Frequently some of these conduits have to be cut into various lengths in the construction of pipe lines, and as a consequence seats have to be formed on the severed ends. By means of the machine described herein seats may be quickly formed on the severed conduit ends as required, the machine forming the male and female seats with equal facility.

A main object of the invention is the provision of a simple machine that will rigidly hold in position an electrical conduit, and quickly form seats on its ends, whereby the various lengths of conduits may be securely held in alinement when laid.

A further purpose is to provide a machine in which the size of the seat cuts may be readily regulated.

Other objects and advantages will be apparent from the following specification, reference being had to the accompanying drawings, in which:

Fig. 1 is a side elevation of the machine mounted on a work bench with a length of conduit mounted therein.

Fig. 2 is a transverse section of the machine, taken on line 2—2 of Fig. 1.

Fig. 3 is a detail view of the cutter member.

Fig. 4 is a longitudinal section of adjacent ends of a pair of conduits, showing the seats formed thereon.

Referring now more specifically to the drawings, the pipe seat cutting machine preferably consists of a substantially circular vertically disposed standard 5, provided adjacent its lower end with a pair of horizontally extending arms 6, 7, spaced apart. The lower arm 7, is provided at its end with a clamping screw 8 in order that the standard may be clamped in convenient position to a work bench top.

Standard 5 is provided with a centrally disposed threaded aperture 12 for the reception of the threaded end 13, of an operating shaft 14. This shaft is provided at the end of its threaded portion with a lug 15 having a square transverse opening therethrough for the reception of the square shank 16 of a seat cutting tool 17, a set screw 18 engaging the shank to hold the tool in its adjusted position. One end of the tool is bent at right angles to the shank portion to form a cutting arm 19, the end being bevelled to form an end cutting edge 20, which bears against the end of the conduit during a rotary seat cutting operation.

In order to rigidly support the conduit when forming seats thereon, a hollow cylindrical mandrel 21 is provided. This mandrel is detachably mounted on the non-threaded portion of the operation shaft 14, being held in place thereon by a set screw 22. The diameter of the mandrel or conduit supporting member is slightly less than the interior diameter of the conduit 23 in order to provide for any inequalities that may exist in the interior surface of the composition conduit.

Conduit 23 is held in clamped relation to the mandrel by means of a plurality of thumb screws 24 each carrying a segmental clamp member 25 swivelly secured thereto, the points 26 entering the surface of the conduit and firmly holding the same against rotation during a seat cutting operation. Thumb screws 24 are mounted in the ends of a plurality of arms 27 formed integral with circular edge of the standard 5 and extend inwardly therefrom at right angles thereto, the arms being radially disposed with respect to the mandrel, as shown in Fig. 3 in order that the conduit will be held in concentric relation to the operating shaft.

When it becomes necessary to form seats on a severed length of conduit in order to complete the required length, the operator places the same upon the mandrel and operates the clamps to hold conduit in position with its end 28 in engagement with the cutting edge 20 of the tool cutting arm 19 as clearly shown in Fig. 3 of the drawing. When in the position as above described the cutter will form an exterior or male seat 29, the seat being cut to a depth of about one half of the thickness of the conduit wall. The operator then adjusts a nut 30 on the threaded portion of the operating shaft to regulate the length of the seat cut and then rotates the shaft 14 through the medium of the crank 31 to reciprocate and rotate the cutting tool, and as the threading on the same is fine the cutting edge of the tool will be slowly forced into engagement with the end of the conduit to effect a seat cut. When the nut 30 engages the standard the shaft is rotated in the reverse direction, the clamps on the conduit are loosened and the same removed and reversed for forming an interior or female seat 32 on the opposite end, the cutting tool being adjusted in the lug of the operating shaft.

The interior seat will be of the exact size as the male seat, and as a consequence the two seats will tightly register when placed together.

From the above description it will be obvious that I have provided a simple and inexpensive machine for forming seats of varying sizes on the ends of composition conduits, and as the machine can be used at the place of operations, economy in time is thereby effected.

What I claim is:

1. A pipe seat cutting machine comprising a vertically disposed frame adapted to be clamped to a support, an operating shaft mounted in said frame for rotation and reciprocation, a mandrel detachably mounted on said shaft, a plurality of clamps mounted on said frame and adapted to engage the exterior surface of the pipe to clamp the same in rigid relation to the mandrel, an adjustable cutting tool mounted transversely on said shaft for forming interior or exterior seats on the end of the pipe, a collar threadingly mounted on the outer end of the said shaft for regulating the depth of the seat cuts, and means to rotate and reciprocate the operating shaft.

2. A pipe seat cutting machine comprising a frame adapted to be secured to a support, a manually operated shaft mounted in said frame, a mandrel detachably secured to said shaft for supporting a pipe thereon and rotatable therewith, radially disposed adjustable clamps connected with the frame for engaging the exterior surface of the pipe to clamp the same in concentric relation to the mandrel, an adjustable seat cutting tool radially secured to the shaft and rotatable therewith for forming interior or exterior seats on the end of the pipe as the shaft is rotated, and a gauge secured to said shaft to limit its inward reciprocation.

3. A pipe seat cutting machine comprising a vertically disposed frame adapted to be clamped to a support, an operating shaft mounted in said frame for rotation and reciprocation, a mandrel detachably secured to said shaft and rotatable therewith, means to clamp a pipe to the frame in concentric relation to said mandrel, a cutting tool radially adjustably mounted on said shaft for forming interior or exterior seat cuts on an end of the pipe, an adjusting nut mounted on the outer end of said shaft for regulating size of the seat cut, and a crank handle to operate the shaft to actuate the cutting tool.

In witness that I claim the foregoing I have hereunto subscribed my name this 16th day of October, 1926.

LEANDER D. SMITH.